US011445426B1

(12) United States Patent
Marupaduga

(10) Patent No.: US 11,445,426 B1
(45) Date of Patent: Sep. 13, 2022

(54) SYSTEM AND METHOD FOR MAKING HANDOVER DETERMINATIONS

(71) Applicant: Sprint Spectrum LP, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 111 days.

(21) Appl. No.: 16/893,480

(22) Filed: Jun. 5, 2020

(51) Int. Cl.
| H04W 36/32 | (2009.01) |
| H04W 36/30 | (2009.01) |
| H04W 36/38 | (2009.01) |
| H04W 36/14 | (2009.01) |
| H04W 36/08 | (2009.01) |

(52) U.S. Cl.
CPC ........... *H04W 36/32* (2013.01); *H04W 36/08* (2013.01); *H04W 36/14* (2013.01); *H04W 36/30* (2013.01); *H04W 36/38* (2013.01)

(58) Field of Classification Search
CPC ..... H04W 36/32; H04W 36/08; H04W 36/14; H04W 36/30; H04W 36/38; H04W 36/00837; H04W 28/08; H04W 28/0804; H04W 28/0812; H04W 28/0819; H04W 28/0226; H04W 28/0236
See application file for complete search history.

(56) References Cited

U.S. PATENT DOCUMENTS

| 9,031,607 | B1* | 5/2015 | Cope ..................... H04W 48/18 455/552.1 |
| 10,129,762 | B1* | 11/2018 | Marupaduga ......... H04W 16/24 |
| 10,178,664 | B1* | 1/2019 | Mansour ............... H04W 72/044 |
| 10,321,334 | B1 | 6/2019 | Marupaduga et al. |
| 2011/0312327 | A1* | 12/2011 | Kubota ................. H04W 36/20 455/436 |
| 2013/0273921 | A1* | 10/2013 | Kenington ............ H04W 16/18 455/446 |

* cited by examiner

*Primary Examiner* — Mazda Sabouri

(57) ABSTRACT

Systems and methods are provided for setting handover thresholds and dynamically initiating handovers based on antenna parameters and wireless device location. A processor identifies an antenna having a sector power ratio exceeding a predefined threshold. Undesirable locations for wireless devices relative to the antenna are determined based on stored information and a first handover threshold is set for wireless devices served by the antenna and in undesirable locations. When a wireless device is found in the undesired location and the sector power ratio exceeds the predefined threshold, the first handover threshold is met. A handover may be initiated.

18 Claims, 7 Drawing Sheets

SYSTEM AND METHOD FOR MAKING HANDOVER DETERMINATIONS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies such as 4G are often used in combination with newer technologies such as 5GNR.

With any RAT including 3G, 4G, and 5G, mobility or handover decisions are made by the access node or base station based on measurement reports from the wireless devices. Multiple measurement items, such as reference signal receive power (RSRP), reference signal received quality (RSRQ), and signal to interference and noise ratio (SINR) may be included in the measurement reports. The reports can help determine the signal quality of the serving cell and neighbor cells. Handovers may be triggered when the signal quality for a neighboring cell or a different RAT is better than the signal quality of the serving sector and/or RAT. Handovers, when performed, may cause a wireless device to be served by a different antenna in a different sector or by an antenna in the same sector utilizing a different RAT.

A base station can allow wireless devices to report serving cell and neighbor cell signal quality and trigger the handover based on these measurements. However, by the time the access node executes the handover, signal quality for the reporting wireless device is often already poor. Further, the continual need for measuring and reporting performance parameters and scheduling resources based on these reports utilizes resource blocks.

Accordingly, a solution is needed that utilizes network parameters to more proactively establish handover thresholds to transition wireless devices in undesirable locations within a sector to a neighboring sector or to different RAT.

Overview

Exemplary embodiments described herein include systems, methods, and processing nodes for setting handover thresholds and dynamically executing handovers for wireless devices in a network. An exemplary method for setting handover thresholds for wireless devices in a network includes determining that a sector power ratio (or SPR) of an antenna deployed by an access node in the network exceeds a pre-defined threshold and identifying an undesired location for wireless devices served by the antenna. The method additionally includes setting a first handover threshold for wireless devices served by the antenna and located in the undesired location and setting a second handover threshold for wireless devices served by the antenna and located in a desired location.

An exemplary system is provided for dynamically handing over a wireless device served by an antenna within a sector in a wireless network. The system includes a processing node and a processor coupled to the processing node. The processor is configured to perform multiple operations including determining that a sector power ratio of the antenna deployed by an access node exceeds a predetermined threshold and identifying a location of the wireless device as an undesired location within the wireless network. In response to the identification, the system dynamically hands the wireless device over to a different RAT or a different sector. Further, in embodiments described herein, the system further performs the operations of setting a first handover threshold for wireless devices served by the antenna and located in the undesired location and setting a second handover threshold for wireless devices served by the antenna and located in a desired location.

In a further exemplary embodiment, a processing node is configured to perform multiple operations. The operations include determining that a sector power ratio of an antenna deployed by an access node exceeds a predetermined threshold and identifying a location of the wireless device as an undesired location within the wireless network based on a parameter of the antenna. The operations further include dynamically, in response to the identification, handing the wireless device over to a different RAT or a different sector.

DETAILED DESCRIPTION

Figure 1:
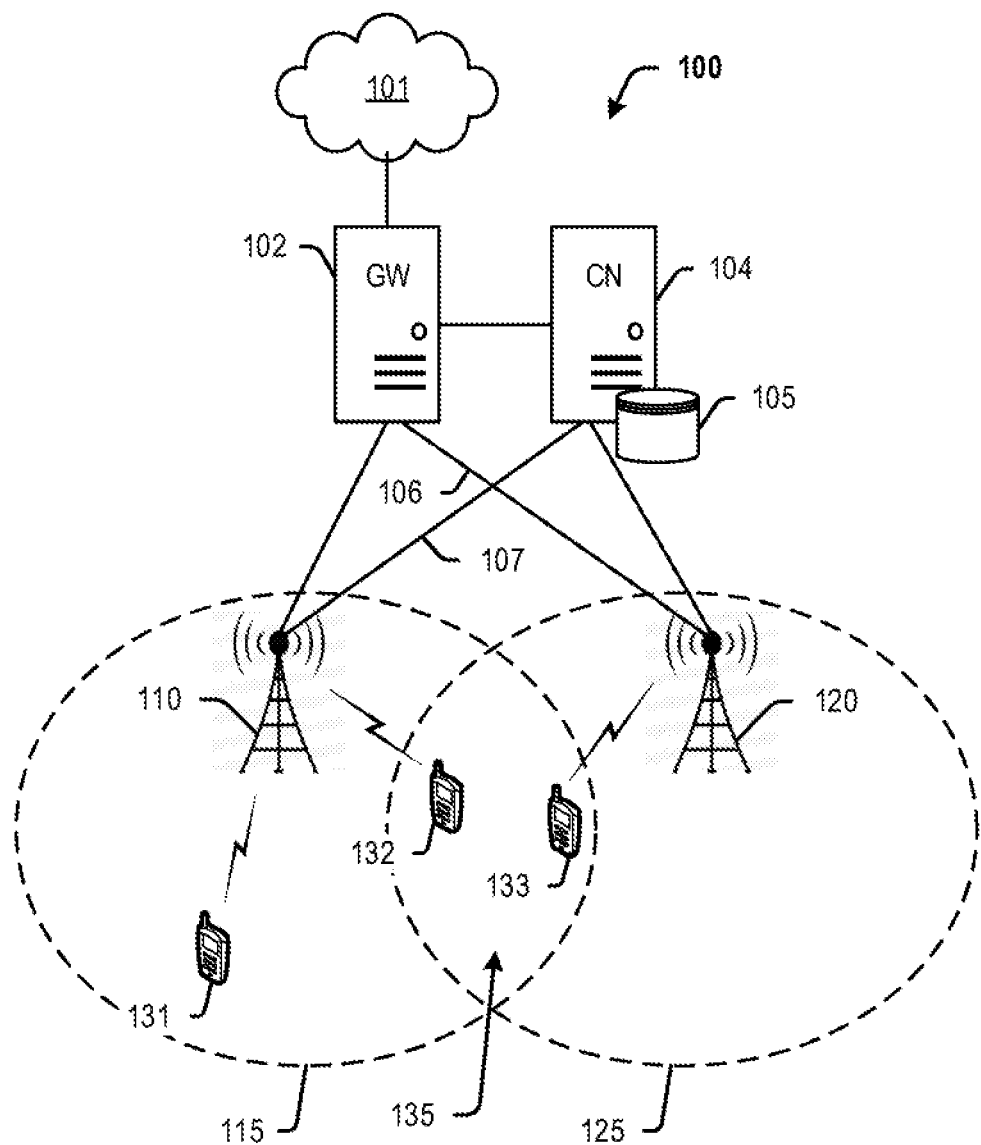
FIG. 1 depicts an exemplary system for wireless communication, in accordance with the disclosed embodiments.

Exemplary embodiments described herein include systems, methods, and processing nodes for defining handover thresholds and for dynamically performing handovers based on the defined handover thresholds. Embodiments further encompass networks utilizing an EN-DC architecture, which allows devices to access both LTE and 5G simultaneously on the same spectrum band. Other network configurations are within scope of the disclosure.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters and wireless device location within a cell or a sector. Because certain network conditions are likely to result in poor performance, embodiments provided herein set handover thresholds to enhance performance parameters for each wireless device and further wireless device locations to dynamically perform handovers when the thresholds are met. In embodiments set forth herein, the handover thresholds are determined based on the location of the wireless device and the sector power ratio of the transmitting antenna.

In exemplary embodiments, a processor or processing node associated with an access node may determine a sector power ratio of the antenna deployed by the access node serving a wireless device. A high sector power ratio indicates poor antenna performance. For example, high performing antennas may have a 4% sector power ratio. A low performance antenna has a higher sector power ratio, which may be, for example, 8 or 9%. Accordingly, a processor or processing node may determine if a wireless device is interacting with an antenna having a sector power ratio above a pre-defined threshold. The pre-defined threshold may be, for example 8%, 9%, or another selected threshold.

Even when the sector power ratio of the antenna exceeds the pre-defined threshold, wireless devices within close proximity to the antenna will have satisfactory performance parameters. However, it is likely that wireless devices in other less desirable locations may have poor performance parameters. For example, devices within areas of overlap with other sectors or antennas may experience poor performance. Additionally, wireless devices at the cell edge are likely to experience poor performance. Accordingly, embodiments of a solution as described herein consider both the sector power ratio of the transmitting antenna and the location of the wireless device communicating with the antenna in order to efficiently perform handovers when poor wireless device performance is expected. Embodiments as disclosed herein do not wait for poor performance to occur in order to execute a handover. In other words, it is not necessary to dynamically measure and report interference in every instance. Instead, embodiments as disclosed herein anticipate interference based on the sector power ratio and wireless device location and proactively hand over the wireless device when poor performance is expected.

In further exemplary embodiments, a location of the wireless device is determined, for example, by triangulation or by geographical coordinates. The method may further determine if the location of the wireless device is an undesirable location. For example, as will be illustrated below, undesirable locations can be determined based on the sector power ratio of an antenna communicating with the wireless device. Undesirable locations often encompass cell edge areas and areas of overlap between sectors. If the sector power ratio is above a predetermined threshold, a large area may suffer from interference or poor performance and thus be considered undesirable. In addition to, or as an alternative to, sector power ratio, other antenna parameters can be utilized to determine whether a location is desirable or undesirable. For example, interference over a particular time period can be measured at the location to determine its desirability. However, because sector power ratio is a static quantity that can be retrieved from a database, the ratio can readily be utilized to determine whether a location is desirable or undesirable.

Embodiments as set forth herein set at least first and second handover thresholds. A first handover threshold is set for devices in undesirable locations and a second handover threshold is set for devices in desirable locations. The first handover threshold may be an event-based threshold, such that, when the sector power ratio exceeds the pre-defined threshold and the wireless device is in an undesired location, the first handover threshold is met. The second handover threshold may be set for devices in desired locations when the sector power ratio exceeds the pre-defined threshold. Thus, the second handover threshold may require that the wireless device performance parameters reported to the access node are unsatisfactory prior to executing a handover. Other handover thresholds may be utilized and may be based on measured performance parameters when the sector power ratio does not exceed the pre-defined threshold. For example, embodiments disclosed herein may include a set of specific handover thresholds for devices in desirable locations. The thresholds may include inter RAT thresholds to neighboring sectors as well as thresholds for handing over from different RATs such as 5G to 4G to 3G.

Accordingly, a method in accordance with embodiments described herein identifies that a sector power ratio exceeds the pre-defined threshold and determines whether the location of the device is desirable or undesirable. These steps may be performed in any order. Upon finding that the pre-defined sector power ratio threshold is exceeded and that the location is undesirable, the method determines the first handover threshold is met and the wireless device is handed over to a different sector or a different RAT without any requirement for actual measurement of wireless device performance parameters. Alternatively, if the location is found to be desirable, the method determines if the second handover threshold is met based on performance parameters of the wireless device. If the second handover threshold is not met, no action is taken with respect to the wireless device and monitoring continues. If the second handover threshold is met, the method hands the wireless device over to a different RAT or different sector.

Therefore, in accordance with embodiments disclosed herein, methods and systems determine handover thresholds based on antenna performance parameters and device locations without the necessity for measurement of actual wireless device performance. Further, embodiments disclosed herein dynamically execute handovers based on the handover thresholds.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a gigabit NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations setting handover thresholds and dynamically executing handovers may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system 100 for use in conjunction with embodiments disclosed herein. System 100 comprises a communication network 101, gateway 102, controller node 104, access nodes 110 and 120, and wireless devices 131, 132, and 133. Access node 110 is illustrated as having a coverage area 115, and access node 120 is illustrated as having a coverage area 125. Wireless devices 131, 132 are located within coverage area 115 and access network services from access node 110. Wireless device 133 is located within coverage area 125 and accesses network services from access node 120. Further, wireless devices 132 and 133 are located within potential interference area 135 formed by an overlap of coverage areas 115, 125. For example, access nodes 110, 120 may be configured to deploy individual sectors and potential interference area 135 may comprise any overlapping coverage area of the sectors. Thus, and as further described herein, wireless devices 132 and 133, which may be in undesirable locations, and may meet a first handover threshold based on the sector power ratio of the antenna exceeding a predetermined threshold and the undesirable locations of the devices. Thus, upon verification of these conditions, the access node 110 may instruct the wireless device 132 to hand over to the access node 120 or the access node 120 may instruct the wireless device 133 to hand over to the access node 110.

Further, a scheduling entity (within, for example, one or both of access nodes 110, 120, or controller node 104) may be configured to allocate resources and provide handover instructions, thereby improving performance in the undesirable area 135. For example, in a 5G network, if antenna parameters are considered to lead to inadequate performance in the area of overlap, the access nodes 110 and 120 may instruct the wireless devices 132 and 133 respectively to hand over to another RAT (e.g. an LTE RAT) or another sector. In embodiments disclosed herein, one or more of access nodes 110, 120 may comprise logic for performing operations including determining an undesirable area such as potential interference area 135 between coverage areas 115, 125 either based on the SPR or other antenna parameters such as SINR measured over a time period (rather than dynamic measurement). While the potential interference area 135 is shown as an exemplary undesirable area, other types of undesirable areas are within the scope of the disclosure. For example, in addition to areas of overlapping coverage, undesirable areas may include areas with high interference or areas with a weak signal, such as a cell edge.

Access nodes 110, 120 can be any network node configured to provide communication between wireless devices 131, 132, 133 and communication network 101, including standard access nodes and/or short range, low power, small access nodes. For instance, access nodes 110, 120 may include any standard access node, such as a macrocell access node, base transceiver station, a radio base station, next generation or gigabit NodeBs (gNBs) in 5G networks, or enhanced eNodeBs (eNBs) in 4G/LTE networks, or the like. In an exemplary embodiment, a macrocell access node can have a coverage area 115, 125 in the range of approximately five kilometers to thirty five kilometers and an output power in the tens of watts. In other embodiments, access nodes 110, 120 can be a small node including a microcell access node, a picocell access node, a femtocell access node, or the like such as a home NodeB or a home eNodeB device. Moreover, it is noted that while access nodes 110, 120 are illustrated in FIG. 1, any number of access nodes can be implemented within system 100.

Access nodes 110, 120 can comprise processors and associated circuitry to execute or direct the execution of computer-readable instructions to perform operations such as those further described herein. Briefly, access nodes 110, 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof Further, access nodes 110, 120 can receive instructions and other input at a user interface. Access nodes 110, 120 communicate with gateway node 102 and controller node 104 via communication links 106, 107. Access nodes 110, 120 may communicate with each other and with other access nodes (not shown) using a direct link such as an X2 link or similar.

Wireless devices 131, 132, 133 may be any device, system, combination of devices, or other such communication platform capable of communicating wirelessly with access nodes 110, 120 using one or more frequency bands deployed therefrom. Wireless devices 131, 132, 133 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110, 120. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 131-133. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107 may include Si communication links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) or 5G NR can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information, such as a sector power ratio of an antenna, coordinates of potential interference area 135, positions of wireless devices 131, 132, 133, defined handover thresholds such as the first and second handover thresholds described herein, scheduling schemes and resource allocations for each of access nodes 110, 120 and wireless devices connected thereto, and so on. This information may be requested by or shared with access nodes 110, 120 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
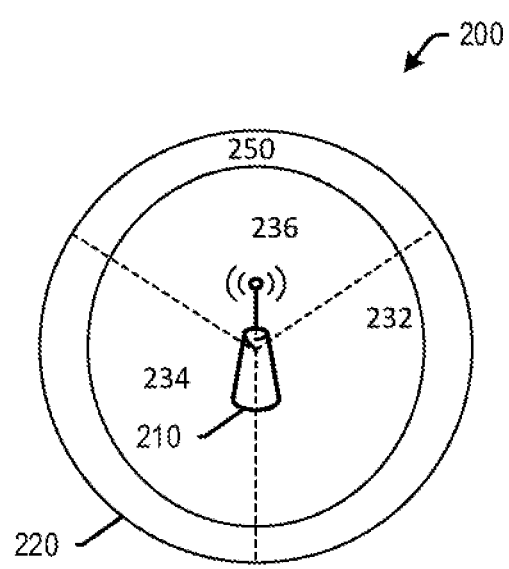
FIG. 2 illustrates an exemplary configuration of an access node coverage area.

FIG. 2 illustrates an exemplary configuration of an access node coverage area 220. An access node 210 communicates with wireless devices within the coverage area 220. The coverage area 220 may be divided into multiple sectors 232, 234, and 236. A cell edge 250 within the coverage area 220 exists in each of the sectors 232, 234, and 236. Areas within the cell edge 250 are likely to overlap with coverage areas of other access nodes. Thus, as set forth herein, wireless devices communicating with the access node 210 from the cell edge 250 may meet the first handover threshold more frequently than the wireless devices in other locations.

Figure 3:
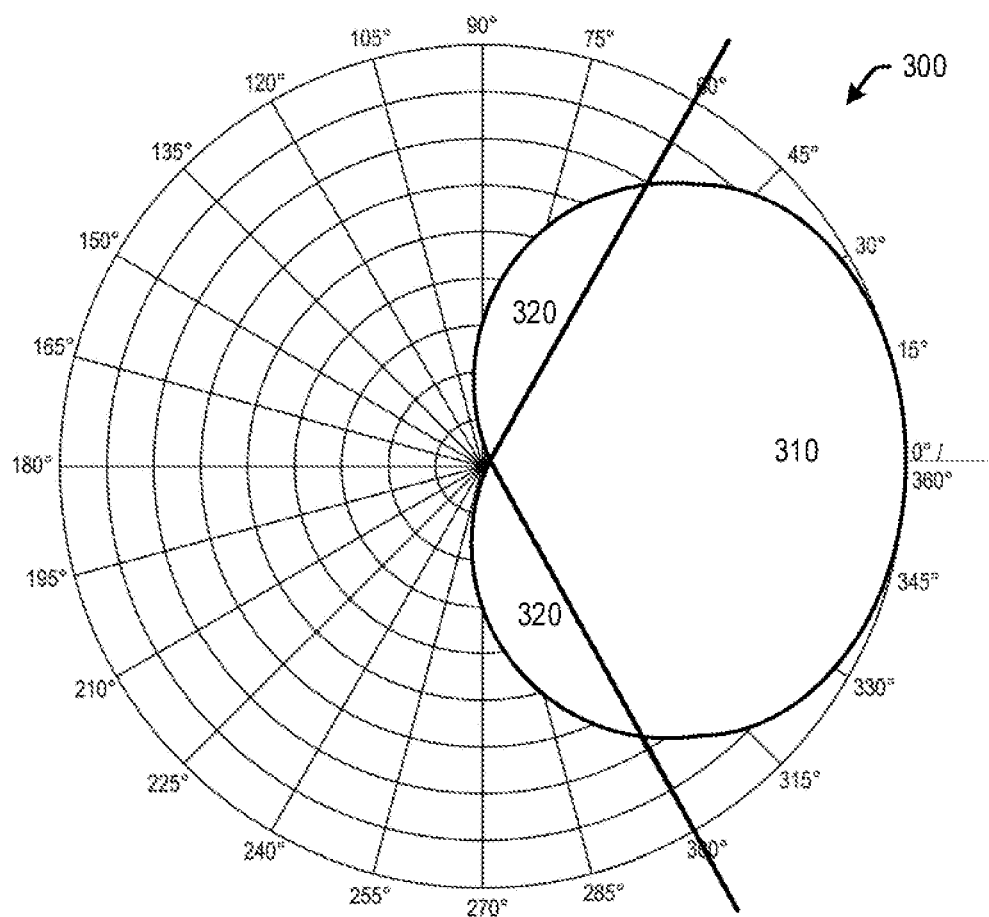
FIG. 3 is a diagram illustrating coverage areas based on antenna sector power ratio in accordance with the disclosed embodiments.

As illustrated in FIG. 3, antennas with a high SPR may result in increased areas of interference and thus, lower performance for wireless devices located in those areas. The sector power ratio may be defined as:

$$SPR(\%) = \frac{\sum_{60}^{300} P_{Undesired}}{\sum_{300}^{60} P_{Desired}} \times 100$$

Sector power ratio 300 is a measure of the ability of an antenna to minimize interference. SPR is an expression of the radio frequency (RF) power radiated outside the sector or in an undesired area 310 versus RF power radiated and retained within the sector or in a desired area 320. High performing antenna designs provide SPRs of 3% to 4% while typical designs yield an SPR of about 8%.

As illustrated in FIG. 3, the sector power ratio can be utilized to distinguish between desirable and undesirable areas as the definition is necessary for calculating the ratio. A high sector power ratio signifies a larger undesired area than a low sector power ratio. In addition to, or instead of using the sector power ratio, undesirable areas generally can be identified based on high interference as measured over time by SINR, low signal strength, and overlapping sectors.

Figure 4:
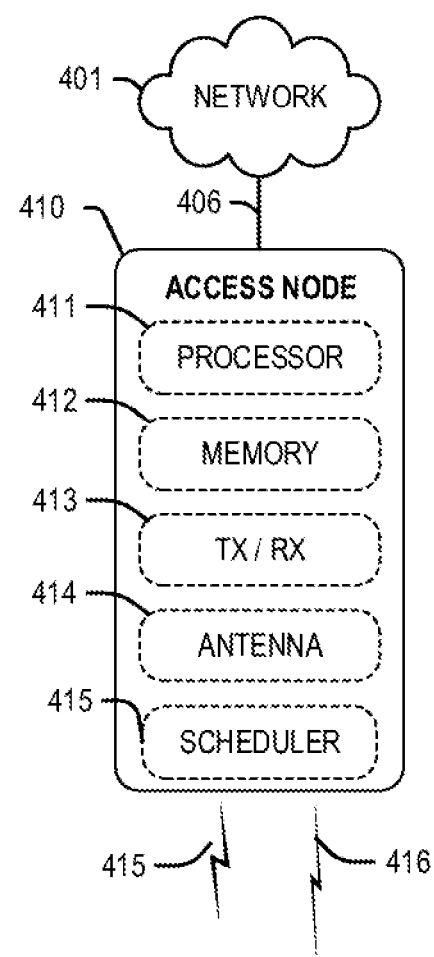
FIG. 4 depicts an access node in accordance with disclosed embodiments.

FIG. 4 depicts an exemplary access node 410. Access node 410 may comprise, for example, a macro-cell access node, such as access node 410 described with reference to FIG. 1. Access node 410 is illustrated as comprising a processor 411, memory 412, transceiver 413, and antenna 414. Processor 411 executes instructions stored on memory 412, while transceiver 413 and antenna 314 enable wireless communication with other network nodes, such as wireless devices and other nodes. For example, access node 410 may be configured to detect wireless devices located in undesirable areas and instruct the wireless devices meeting the conditions described herein to handover or connect to a different RAT or sector. Scheduler 415 may be provided for scheduling resources based on the presence of the wireless devices. These features may be enabled by access node 410 comprising two co-located cells, or antenna/transceiver combinations that are mounted on the same structure. Network 401 may be similar to network 101 discussed above. The wireless devices may operate in carrier aggregation mode, during which a wireless device utilizes more than one carrier, enabling the wireless devices to communicate with access node 410 using a combination of resources from multiple carriers.

Further, instructions stored on memory 412 can include instructions for dynamically executing a handover of a wireless device, which will be further explained below with reference to FIGS. 6 and 7. The instructions may facilitate setting handover thresholds and comparing the monitored values with stored metrics or stored predetermined thresholds. If the measured values are outside of predetermined boundaries, the instructions may dictate dynamically instructing one or more wireless devices to connect to a different sector or RAT.

Figure 5:
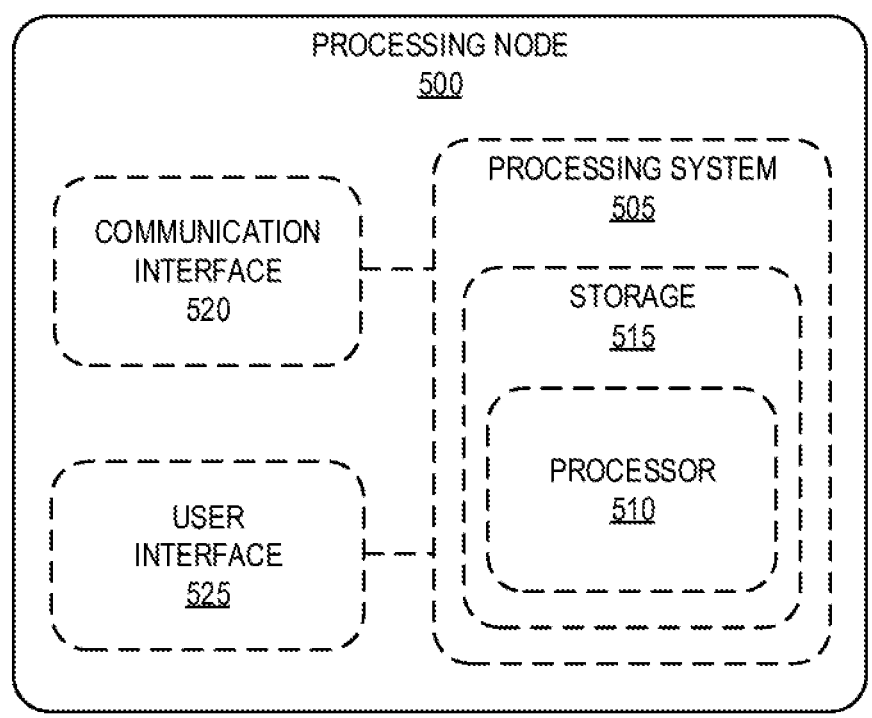
FIG. 5 depicts a processing node in accordance with the disclosed embodiments

FIG. 5 depicts an exemplary processing node 500, which may be configured to perform the methods and operations disclosed herein for setting handover thresholds and for dynamically executing handovers in order to improve performance in a wireless network. In some embodiments, processing node 500 may be included in an access node, such as access node 110 or 410. In further embodiments, processing node 500 may be included in controller node 104 and may be configured for controlling the access nodes.

Processing node 500 may be configured for performing handover management in the network by setting handover thresholds and dynamically executing handovers as set forth above. The determination of whether handover thresholds are met may occur dynamically in real time based on an identification of a wireless device operating in undesirable location in a sector or in a network, such as the network 101. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as touch screens, buttons, displays, speakers, etc. Processing node 500 may further include other components such as a power management unit, a control interface unit, etc.

The disclosed methods for setting handover thresholds based on antenna characteristics and device location are further discussed with reference to FIG. 6. FIG. 6 illustrates an exemplary method 600 for setting handover thresholds. The method may occur in dynamically in real time or at predetermined intervals. Method 600 may be performed by any suitable processor discussed herein, for example, a processor included in access node 110 or 410, processor 510 included in processing node 500, or a processor included in controller node 104. For discussion purposes, as an example, method 600 is described as being performed by a processor included in access node 110.

Method 600 starts in step 610 and the access node may determine that an antenna sector power ratio exceeds a pre-defined threshold. The threshold may, for example be 8% or 9%. In step 620, the system identifies undesired locations for wireless devices served by the antenna. The identification may be based on the undesired locations as defined by the sector power ratio. Undesired locations may also be identified by other methods such as identifying a cell edge, an overlapping coverage area, or an area that characteristically experiences a weak signal. In step 630, the access node may set a first handover threshold for wireless devices found in the undesired locations and a second handover threshold for wireless devices found in desired locations. The first handover threshold may simply be an event-based threshold that is not based on actual dynamic measurement of interference or SINR. Instead, the first handover threshold may be met when the power sector ratio is above the predetermined threshold and the wireless device is found in an undesired location.

The second handover threshold may be a performance based threshold. Thus, when the sector power ratio exceeds the predefined threshold, and the device is in a desired location, specific performance parameters would be measured and evaluated to initiate a handover. For example, the second handover threshold may require a predetermined level of SINR in the location of the wireless device in order to initiate a handover. Embodiments disclosed herein may have include a set of specific handover thresholds for devices in desirable locations. The thresholds may include inter RAT thresholds to neighboring sectors as well as thresholds for handing over from different RATs such as 5G to 4G to 3G.

Figure 6:
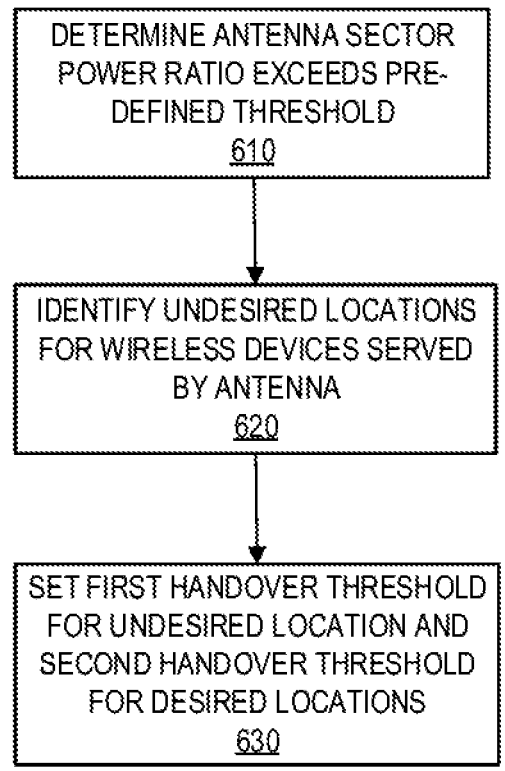
FIG. 6 depicts an exemplary method for setting handover thresholds in accordance with disclosed embodiments.
Figure 7:
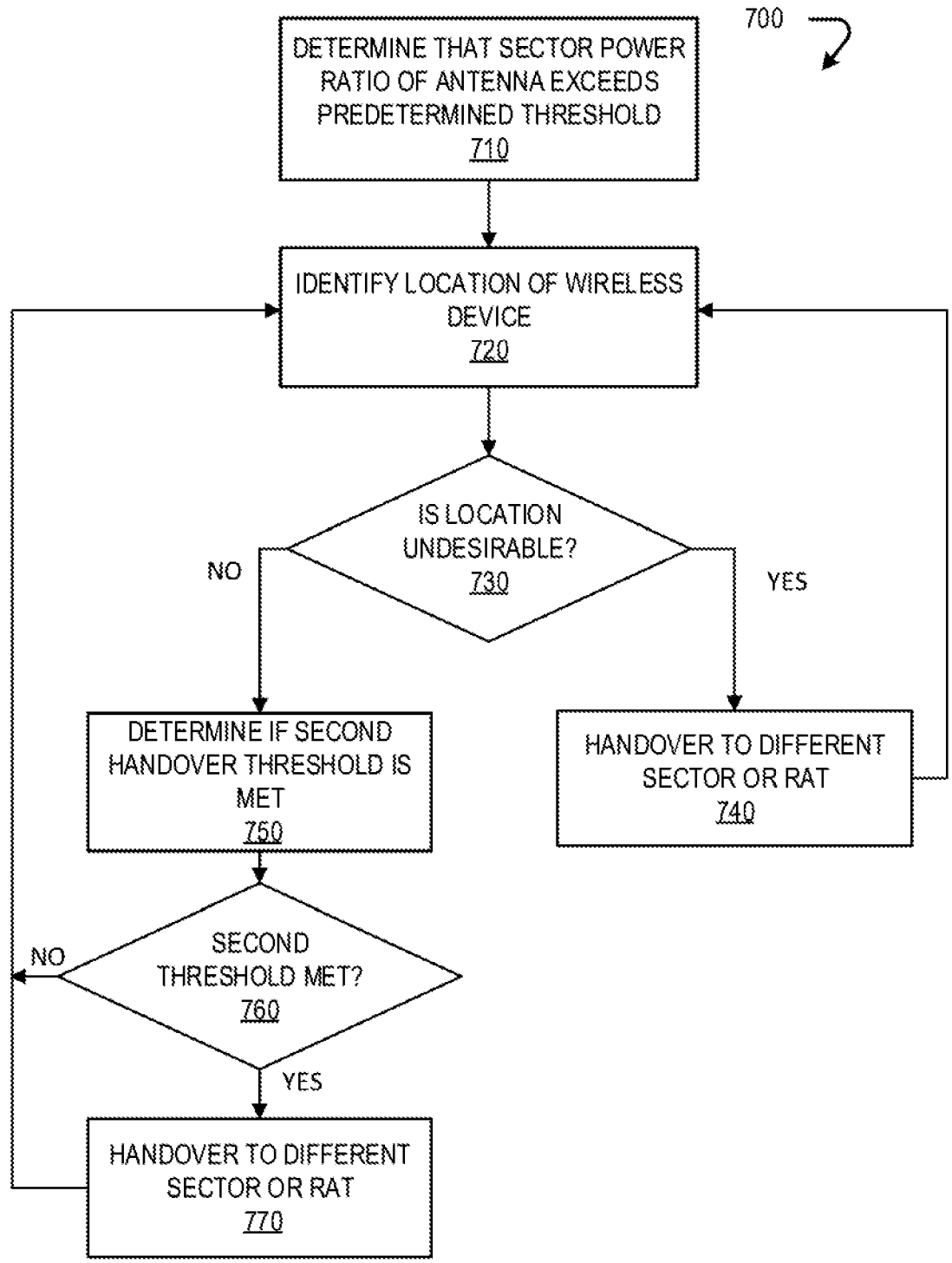
FIG. 7 depicts another exemplary method for dynamically triggering a handover in accordance with disclosed embodiments.

The method of FIG. 7 illustrates a method 700 for dynamic execution of handovers based on the handover thresholds set in accordance with the method of FIG. 6. Method 700 may be performed by any suitable processor discussed herein, for example, a processor included in access node 110 or 410, processor 510 included in processing node 500, or a processor included in controller node 104. For discussion purposes, as an example, method 700 is described as being performed by a processor included in access node 110.

In step 710, the access node determines that the sector power ratio of the antenna exceeds the predetermined threshold, that may be, for example 8%, 9% or another pre-selected value. In step 720, the access node identifies a location of the wireless device. In order to make this identification, the access node may determine a location of the wireless device through one of various methods including triangulation or GPS coordinates. In step 730, the access node determines if the location identified in step 720 is undesirable. The access node may be aware of undesirable locations based on the sector power ratio, other antenna parameters, defined areas of overlapping coverage, or defined cell edge areas as set forth above. The undesirable locations are preferably stored in a database accessible to the access node. Determination of undesirable locations is accomplished based on stored parameters and does not require dynamic measurement of performance parameters by the wireless device or the access node.

If the location is found to be undesirable in step 730, the access node determines that the first handover threshold has been met and initiates a handover to a different sector or a different RAT in step 740. For example, if the device is connected to 5G NR, a handover may be initiated by instructing the wireless device to connect to 4G LTE. Alternatively, the handover may be initiated by instructing the wireless device to connect to an access node in a different sector. The instruction may be sent by the access node to the wireless device for example by utilizing an RRC connection reconfiguration message or another message directed specifically to the wireless device. The access node continues to monitor the locations of wireless devices in the sector in step 710.

Alternatively, if the location is found to be a desirable location in step 730 as the identified location of the wireless device is not a location stored as undesirable, the access node determines if the second handover threshold is met. Desirable locations may include locations with high signal strength, low interference, low SPR, high SINR, or other indicators that lead to satisfactory network performance. As set forth above, the second handover threshold may be a threshold based on performance parameters of the wireless device or interference or SINR reported in the location of the wireless device. The parameters may be reported from the wireless device to the access node by channel status information (CSI) reporting, by a connect request, or other mechanism. If the second threshold is met in step 760, the access node instructs the wireless device to connect to another sector or RAT. If the handover threshold is not met in step 760, no handover occurs, and location monitoring continues.

While the method of FIG. 6 aims to set handover thresholds based on device location and antenna characteristics, the method of FIG. 7 may be utilized to dynamically initiate handovers of wireless devices. The determination of the first handover threshold and initiation of a handover for wireless devices meeting the first handover threshold can be accomplished without actual performance measurement. Accordingly, methods as disclosed herein avoid performance deterioration by proactively executing handovers based on antenna parameters and device location.

In some embodiments, methods 600 and 700 may include additional steps or operations. Furthermore, the methods may include steps shown in each of the other methods. As one of ordinary skill in the art would understand, the methods 600, 700, and 800 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for setting handover thresholds for wireless devices in a network, the method comprising:
   determining that a sector power ratio of an antenna deployed by an access node in the network exceeds a pre-defined threshold;
   identifying an undesired location for a wireless device served by the antenna; and
   setting a first handover threshold for the wireless device served by the antenna and located in the undesired location and setting a second handover threshold for wireless devices served by the antenna and located in a desired location.

2. The method of claim 1, further comprising setting the first handover threshold as an event-based handover threshold such that a handover of the wireless device occurs when the sector power ratio exceeds the pre-defined threshold and the wireless device is in the undesired location.

3. The method of claim 1, wherein the second handover threshold is based on interference reported by the wireless device to the access node.

4. The method of claim 1, further comprising dynamically handing the wireless device to a neighboring sector when the first handover threshold is met.

5. The method of claim 1, further comprising dynamically handing the wireless device to a different RAT when the first handover threshold is met.

6. The method of claim 1, further comprising identifying a wireless device location based on triangulation to determine if the first handover threshold is met.

7. The method of claim 1, further comprising identifying a wireless device location based on longitude and latitude coordinates to determine if the first handover threshold is met.

8. The method of claim 1, further comprising identifying the undesired location based on the sector power ratio of the antenna.

9. The method of claim 1, further comprising identifying the undesired location based on interference reported over a time period.

10. A system for dynamically handing over a wireless device served by an antenna within a sector in a wireless network, the system comprising:
    a processing node; and
    a processor coupled to the processing node configured to perform operations comprising:
        determining that a sector power ratio of the antenna deployed by an access node exceeds a predetermined threshold;
        identifying a location of the wireless device as an undesired location within the wireless network;
        setting a first handover threshold for wireless devices served by the antenna and located in the undesired location and setting a second handover threshold for wireless devices served by the antenna and located in a desired location; and
        dynamically, in response to the identification, handing the wireless device over to a different RAT or a different sector.

11. The system of claim 10, wherein the first handover threshold is an event-based handover threshold triggering a handover of a wireless device when the sector power ratio exceeds the predetermined threshold and the wireless device is in the undesired location.

12. The system of claim 10, wherein the second handover threshold is based on interference reported by the wireless device to the access node.

13. The system of claim 10, wherein the operations further comprise dynamically handing the wireless device to a different RAT when the first threshold is met.

14. The system of claim 10, wherein the operations further comprise identifying the undesired location based on based on the sector power ratio of the antenna.

15. The system of claim 10, wherein the operations further comprise identifying the undesired location based on interference reported over a time period.

16. A processing node configured to perform operations comprising:
    determining that a sector power ratio of an antenna deployed by an access node within a wireless network exceeds a predetermined threshold;
    identifying a location of a wireless device as an undesired location within the wireless network based on a parameter of the antenna;
    setting a first handover threshold for wireless devices served by the antenna and located in the undesired location and setting a second handover threshold for wireless devices served by the antenna and located in a desired location; and
    dynamically, in response to the identification, handing the wireless device over to a different RAT or a different sector.

17. The processing node of claim 16, wherein the operations further comprise identifying the location as undesired based on the sector power ratio of the antenna deployed by the access node.

18. The processing node of claim 16, wherein the operations further comprise identifying the location as undesired based on interference within a sector of the wireless network measured over a time period.

* * * * *